United States Patent

[11] 3,625,366

[72] Inventor Felipe Urbano Garrone
Cuidad de La Paz 432, piso 6, Buenos Aires, Argentina
[21] Appl. No. 70,818
[22] Filed Sept. 9, 1970
[45] Patented Dec. 7, 1971

[54] CONICAL CENTRIFUGE FOR THE SEPARATION OF SOLID MATTER AND A FLUID
1 Claim, 6 Drawing Figs.

[52] U.S. Cl. .................................................. 210/330
[51] Int. Cl. ................................................ B01d 33/02
[50] Field of Search .......................................... 210/330, 360, 378, 381, 398

[56] References Cited
UNITED STATES PATENTS
610,983 9/1898 Chapman ..................... 210/330
2,695,133 11/1954 Drury .......................... 210/378 X Primary Examiner—Reuben Friedman
Attorney—Holman & Stern ABSTRACT: A conical centrifuge for the separation of solid matter and a fluid, comprising a plurality of arcuate, elongated sections grouped together so as to form a rotary truncated conical assembly, each section having a filter, a support for the filter, and a backplate provided with guide fins for the channelling of the fluid passing through the filter, the sections being flanked by, radially extending chambers communicating with the chambers through openings formed in the part of these chambers located opposite the space between the respective supports and backplates, an inlet for admitting fluid carrying solid matter being disposed at the truncated end of the assembly, the inlet communicating with each filter section, the radially extending chambers communicating with each other and with the openings disposed on a corresponding generating line of the truncated assembly for the discharge of treated fluid, the assembly being surrounded by an envelope for receiving the filtered fluid and the solid matter being surrounded by an envelope for receiving the filtered fluid and the solid matter being discharged from the end of larger diameter of the conical assembly.

INVENTOR
Felipe Urbano Barrone
BY Holman & Stern
ATTORNEYS

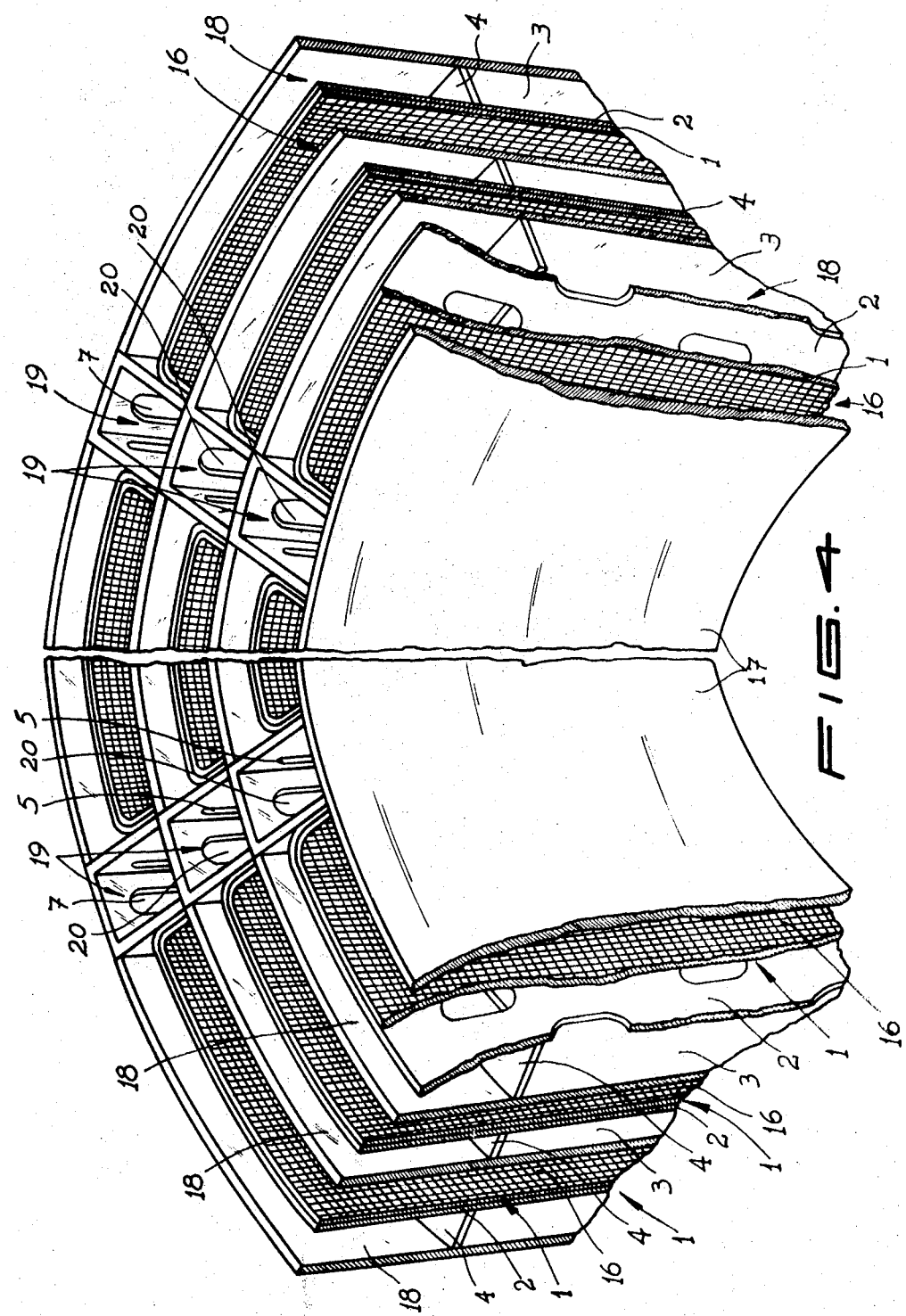

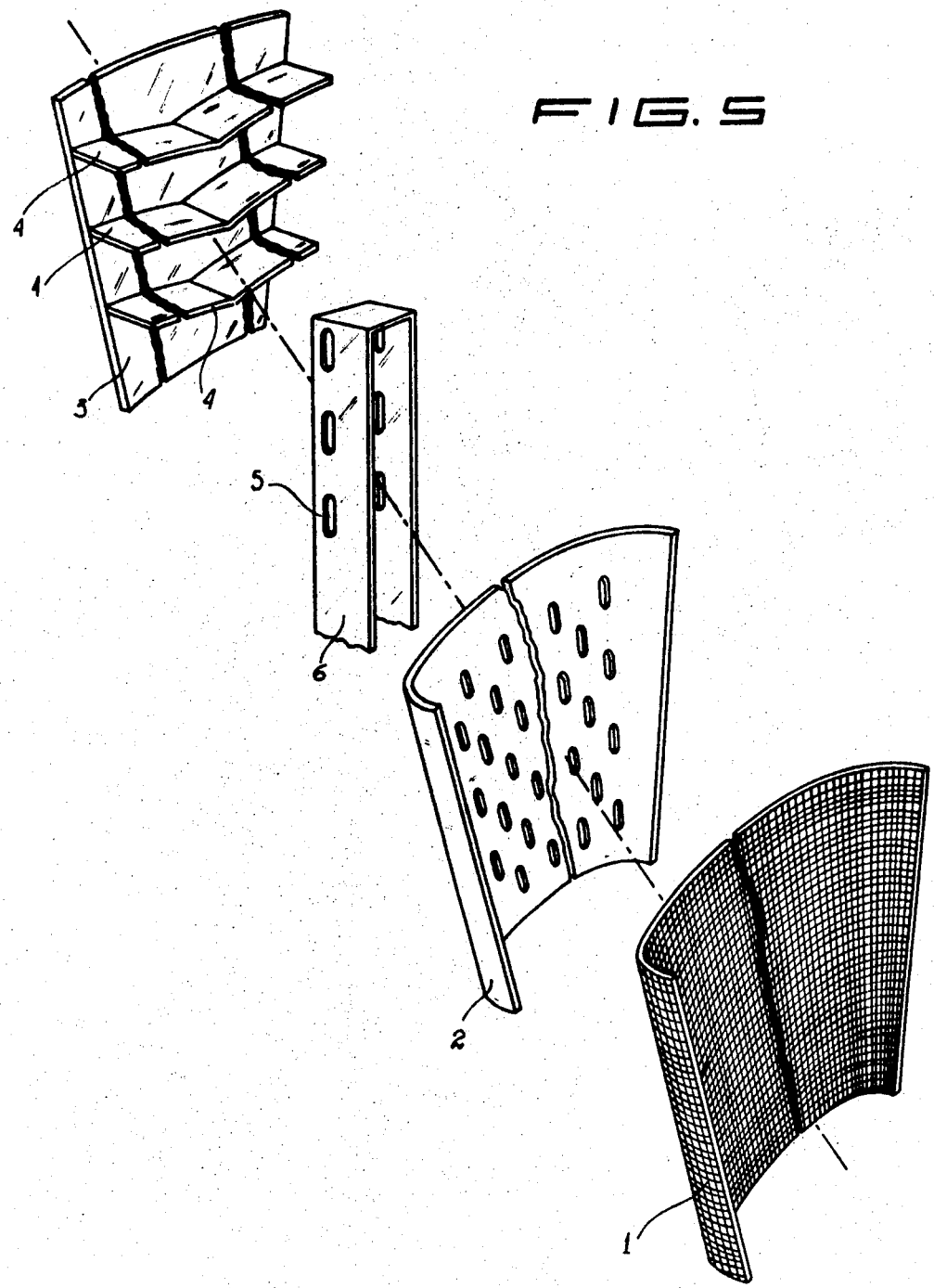

CONICAL CENTRIFUGE FOR THE SEPARATION OF SOLID MATTER AND A FLUID

The present invention relates to conical centrifuges for the separation of solid particles from fluids containing the particles. For example, the centrifuge can be used in the sugar industry for the separation of sugar from molasses.

According to the present invention there is provided a conical centrifuge for the separation of solid matter and a fluid, comprising a plurality of arcuate, elongated sections grouped together so as to form a rotary truncated conical assembly, each section having a filter, a support for the filter and a backplate provided with guide fins for the channelling of the fluid passing through the filter, the sections being flanked by radially extending chambers communicating with the chambers through openings formed in the part of these chambers located opposite the space between the respective supports and backplates, an inlet for admitting fluid carrying solid matter being disposed at the truncated end of the assembly, the inlet communicating with each filter section, the radially extending chambers communicating with each other and with the openings disposed on a corresponding generating line of the truncated assembly for the discharge of treated fluid, the assembly being surrounded by an envelope for receiving the filtered fluid and the solid matter being discharged from the end of larger diameter of the conical assembly.

It is thus possible to multiply within the same space the useful separating surface and thereby even to reduce the mesh of a filter grid, since the smallest yield per unit is largely compensated by the greatest useful surface available, thus, enabling the smallest particles to be separated, while the overall yield of the apparatus is better than that of conical centrifuges having only one separating member.

As a result of the sections being disposed concentrically they are connected to a single drive or control shaft, common to all, so that only one energy source drives the entire apparatus. A system for recovering residual fluid is provided after separation of the solid matter, said system ensuring the obtaining of a final product of excellent quality, the granulometric characteristics of which are the smallest possible.

Thus the centrifuge is provided with conduits suitable for receiving and discharging fluid from the conical separator, which is obviously capable of functioning in any of the usual positions of this type of centrifuge, but which is preferably arranged with its axis of movement in a horizontal position, this form of construction being more suitable for the proposed object.

The invention will be described, by way of example, with reference to the accompanying drawings, in which:

FIG. 4 is a perspective view on a larger scale than that of the other figures, showing the arrangement of the concentric sections and that of the interconnected radial chambers.

FIG. 5 shows the essential members of the apparatus, namely a filter grid or separator, a counterfilter and a rear wall with its fins for guiding fluid after separation, said fins being intended to channel the fluid in the direction of the corresponding openings in the respective radial chamber.

In all the figures, the same reference numerals indicate identical or corresponding parts.

Figure 2:
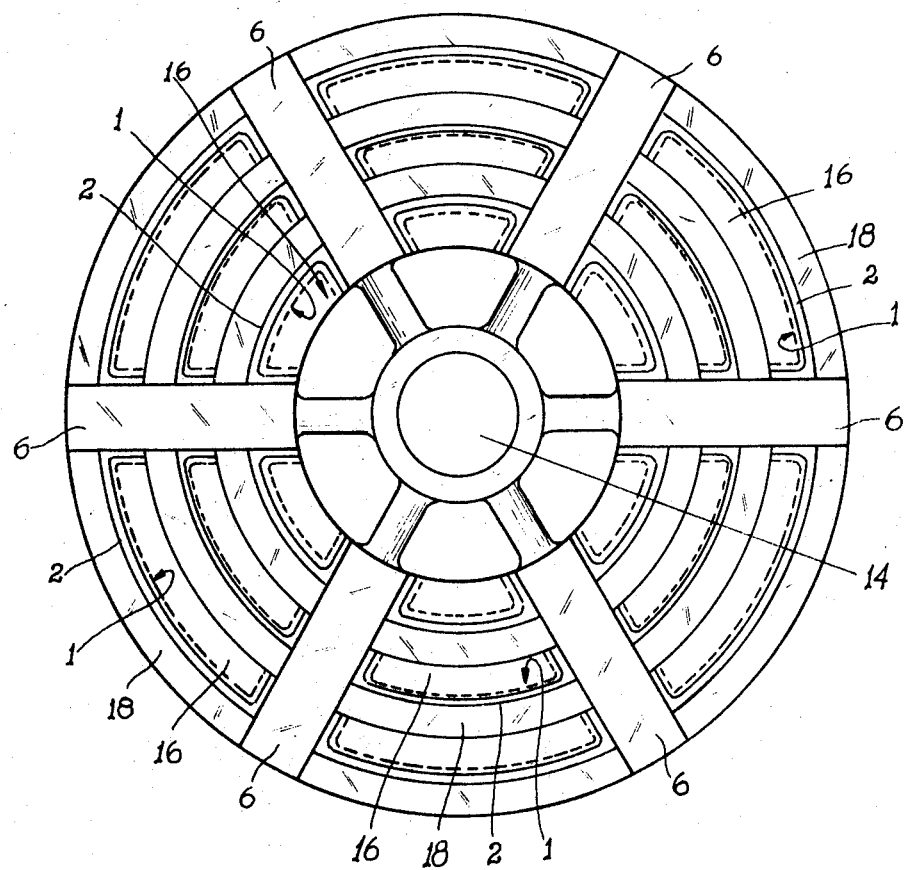
FIG. 2 is a front view of the conical assembly.
Figure 3:
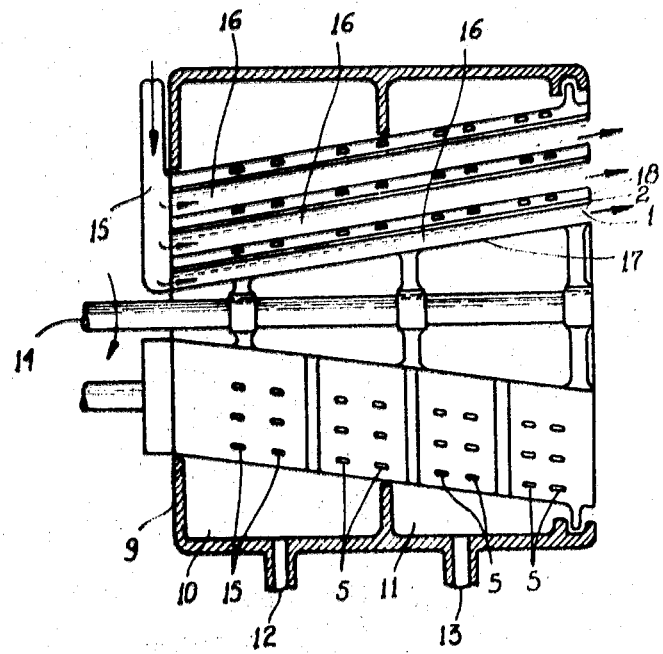
FIG. 3 is a section taken on the line a —a of FIG. 1.
Figure 6:
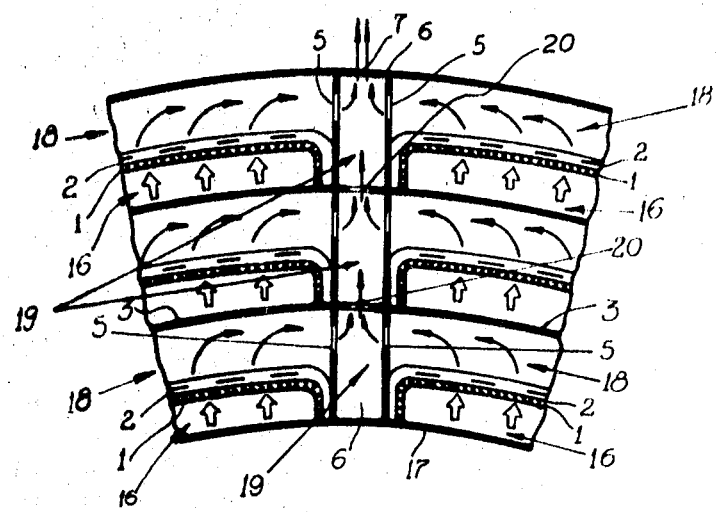
FIG. 6 is a schematic view showing the functional arrangement of the proposed apparatus.

According to the preferred embodiment shown, the improved conical centrifuging separator, specially intended to be used to separate solid matter from liquids, comprises a series of elongated arcuate sections which, when assembled together, form concentric conical members, each section comprises a filter grid 1 of sheet metal, wire or the like materials (FIG. 1), a perforated plate 2 which takes the place of a counterfilter (FIG. 2) and a backplate 3 provided with fins 4 directed towards openings 5 formed in tubular elements 6 of square, rectangular section or of any other similar shape. When assembled radially, and possibly connected together in a conventional manner the elements 6 form radial chambers (see details in FIG. 4, schematic view in FIG. 1 and the section in FIG. 3) to receive fluid removed in the course of the centrifuging operation, to discharge the fluid out of the apparatus through side openings 7 in the outer cone 8 (FIG. 1 and FIG. 3) and collect it in the envelope 9 in at least two adjacent collectors 10 and 11 with their independent outlets 12 and 13.

Figure 1:
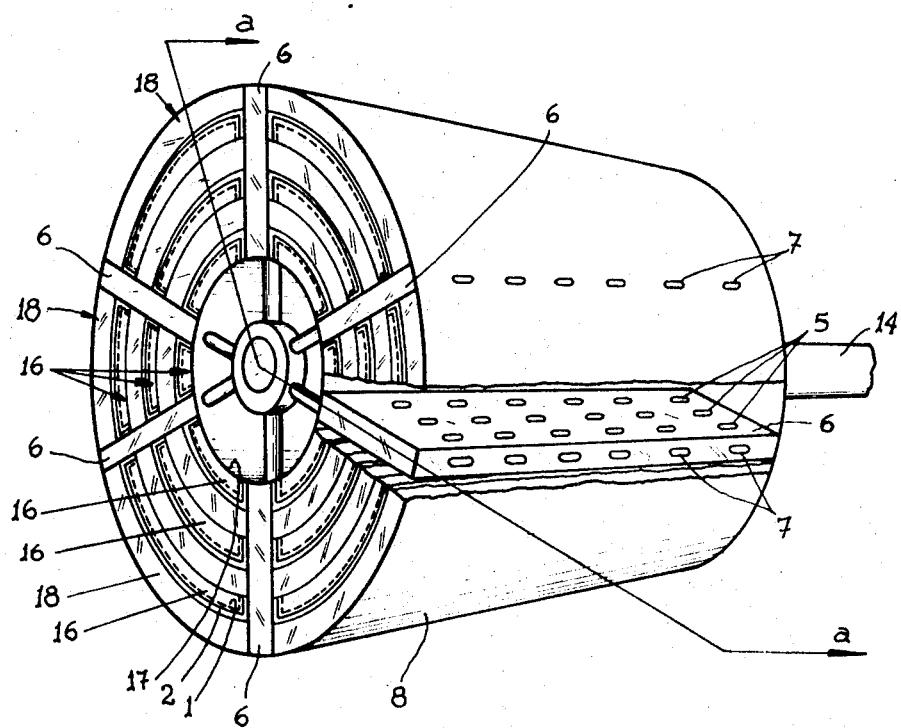
FIG. 1 shows schematically and in perspective a view of the proposed conical separator, minus control means, supports, bearings and other items of the usual type, the walls being partially cut away in order to show one of the radial chambers through which fluid is discharged in the course of the centrifuging action.

The various radial sections which increase progressively in size, are interconnected together to form a substantially truncated conical assembly shown in FIG. 1, this assembly being connected to a rotary shaft 14 extending beyond the small base of the cone. A fluid inlet 15 for conveying fluid carrying the solid matter is disposed at the same end of the cone as the shaft extension. Fluid is introduced through several delivery tubes, each delivery tube coinciding in its arrangement with a cavity 16 in each radial section between the front face of the metal grid 1 and the rear plate of the immediate adjacent section or the rear face of a central plate 17 when the first radial section from the center of the truncated assembly is concerned.

Below the shaft, a device may be installed, if necessary, for feeding water, liquid or washing fluid, represented at 18' in a general form and merely by way of example.

The cavities 16 are open at both ends. Through one end they receive the fluid charged with particles to be separated and through the other, these particles—separated by centrifuging—emerge, while the fluid flows through the meshes of the metal grid and enters an inner chamber 18, formed in each radial section behind the counter filter plate and between the latter and the front of the respective backplate 3. The inner chamber is closed at both ends, but communicating with the sides of the corresponding radial chambers 19 which themselves are connected together through the openings 20 to terminate at the outlets formed by said openings 7. The channelling of the fluid in the inner chambers 18 towards the openings 5 communicating with the radial chambers 19 is assisted by the the guide fins 4.

The fluid which contains the particles to be separated is supplied continuously to the inlet 15 which feeds it to the aforesaid cavities 16 where the above-described cycle begins and is reproduced continuously at the same rate as the assembly turns with a centrifuging speed. Thus, in a volume normally occupied by only one centrifuge separator or centrifuge filter, it is possible, due to this arrangement to place two, three, four or more elements. The separating and/or filtering surface increases in such proportions that it becomes possible to use filter meshes of extremely small dimensions, in view of the fact that the smallest yield per surface unit is largely compensated by the above increase of active surface available and hence the general yield is much better than that obtained with devices in use at present, by consuming less energy, occupying less space and all this at a cost just slightly above that of a conventional machine giving a considerably smaller yield.

It will be appreciated that the present invention is in no way limited to the described and illustrated embodiment. Various modifications of shape and/or detail are possible, without departing from the scope of the present invention.

What I claim is:

1. A conical centrifuge for the separation of solid matter and a fluid comprising a plurality of arcuate, elongated sections grouped together so as to form a rotary truncated conical assembly, each section having a filter, a support for the filter, and a backplate provided with guide fins for the channelling of the fluid passing through the filter, the sections being flanked by radially extending chambers communicating with the chambers through openings formed in the part of these chambers located opposite the space between the respective supports and backplates, an inlet for admitting fluid carrying solid matter being disposed at the truncated end of the assembly, the inlet communicating with each filter section, the radially extending chambers communicating with each other and with the openings disposed on a corresponding generating line of the truncated assembly for the discharge of treated fluid, the assembly being surrounded by an envelope for receiving the filtered fluid and the solid matter being discharged from the end of larger diameter of the conical assembly.

* * * * *